United States Patent
Chadwick et al.

(10) Patent No.: US 11,614,985 B2
(45) Date of Patent: Mar. 28, 2023

(54) INSERT OPERATION

(71) Applicant: Arm Limited, Cambridge (GB)

(72) Inventors: Alexander Donald Charles Chadwick, Cambridge (GB); Andrew Brookfield Swaine, Sheffield (GB); Gareth James Evans, Sandhurst (GB); Jonathan Curtis Beard, Austin, TX (US)

(73) Assignee: Arm Limited, Cambridge (GB)

( * ) Notice: Subject to any disclaimer, the term of this patent is extended or adjusted under 35 U.S.C. 154(b) by 163 days.

(21) Appl. No.: 17/130,474

(22) Filed: Dec. 22, 2020

(65) Prior Publication Data

US 2022/0197791 A1     Jun. 23, 2022

(51) Int. Cl.
*G06F 11/00* (2006.01)
*G06F 11/07* (2006.01)
*G06F 12/06* (2006.01)

(52) U.S. Cl.
CPC ...... *G06F 11/0727* (2013.01); *G06F 11/0751* (2013.01); *G06F 11/0772* (2013.01); *G06F 12/0646* (2013.01); *G06F 2212/1008* (2013.01)

(58) Field of Classification Search
None
See application file for complete search history.

(56) References Cited

U.S. PATENT DOCUMENTS

| | | | | |
|---|---|---|---|---|
| 2006/0236011 A1* | 10/2006 | Narad | ........................ | G06F 5/10 710/240 |
| 2006/0277126 A1* | 12/2006 | Rosenbluth | ............ | G06Q 40/00 705/35 |
| 2009/0187682 A1* | 7/2009 | Arndt | .................. | G06F 13/4059 710/110 |
| 2010/0332755 A1* | 12/2010 | Bu | ............................ | G06F 9/52 711/119 |
| 2013/0081060 A1* | 3/2013 | Otenko | ..................... | G06F 9/52 719/314 |
| 2018/0253890 A1* | 9/2018 | Cook | ........................ | G06T 1/60 |

OTHER PUBLICATIONS

Google Scholar/Patents search—text refined (Year: 2022).*

* cited by examiner

*Primary Examiner* — Christopher S McCarthy
(74) *Attorney, Agent, or Firm* — Nixon & Vanderhye P.C.

(57) ABSTRACT

An apparatus comprises memory access circuitry to access a memory system; a plurality of memory mapped registers, including at least an insert register and a producer pointer register; and control circuitry to perform an insert operation in response to receipt of an insert request from a requester device sharing access to the memory system. The insert request specifies an address mapped to the insert register and an indication of a payload. The insert operation includes controlling the memory access circuitry to write the payload to a location in the memory system selected based on a producer pointer value stored in the producer pointer register, and updating the producer pointer register to increment the producer pointer value.

19 Claims, 9 Drawing Sheets

INSERT OPERATION

BACKGROUND

Technical Field

The present technique relates to the field of data processing.

Technical Background

A data processing system may use a buffer structure to queue information for access by consumer circuitry. There can be multiple requesters sharing the same buffer, who can request insertion of items into the buffer structure by issuing a memory access request to a shared memory system shared between the requesters. When an item is inserted into the buffer, a pointer is updated to track the next entry of the buffer to update when a following item is inserted. However, if multiple requesters share the same buffer, there can be a problem of synchronising updates to the pointer and the buffer. Typically, locks are used to ensure exclusivity. However, use of locks may introduce extra reads and write transactions which introduces latency.

SUMMARY

Viewed from aspect, the present technique provides an apparatus comprising:

memory access circuitry to access a memory system;

a plurality of memory mapped registers, including at least an insert register and a producer pointer register; and control circuitry to perform an insert operation in response to receipt of an insert request from a requester device sharing access to the memory system, the insert request specifying an address mapped to the insert register and an indication of a payload, the insert operation including controlling the memory access circuitry to write the payload to a location in the memory system selected based on a producer pointer value stored in the producer pointer register, and updating the producer pointer register to increment the producer pointer value.

At least some examples provide a method for an apparatus comprising memory access circuitry to access a memory system and a plurality of memory mapped registers, including at least an insert register and a producer pointer register; the method comprising:

receiving an insert request from a requester device sharing access to the memory system, the insert request specifying an address mapped to the insert register and an indication of a payload; and in response to receipt of the insert request, performing an insert operation including controlling the memory access circuitry to write the payload to a location in the memory system selected based on a producer pointer value stored in the producer pointer register, and updating the producer pointer register to increment the producer pointer value.

At least some examples provide an apparatus comprising:

means for accessing a memory system;

a plurality of means for memory mapped register storage, including at least a means for storing an insert value and a means for storing a producer pointer value; and means for performing an insert operation in response to receipt of an insert request from a means for requesting which shares access to the memory system, the insert request specifying an address mapped to the means for storing the insert value and an indication of a payload, the insert operation including writing the payload to a location in the memory system selected based on the producer pointer value, and updating the means for storing the producer pointer value to increment the producer pointer value.

Further aspects, features and advantages of the present technique will be apparent from the following description of examples, which is to be read in conjunction with the accompanying drawings.

DESCRIPTION OF EXAMPLES

Figure 1:
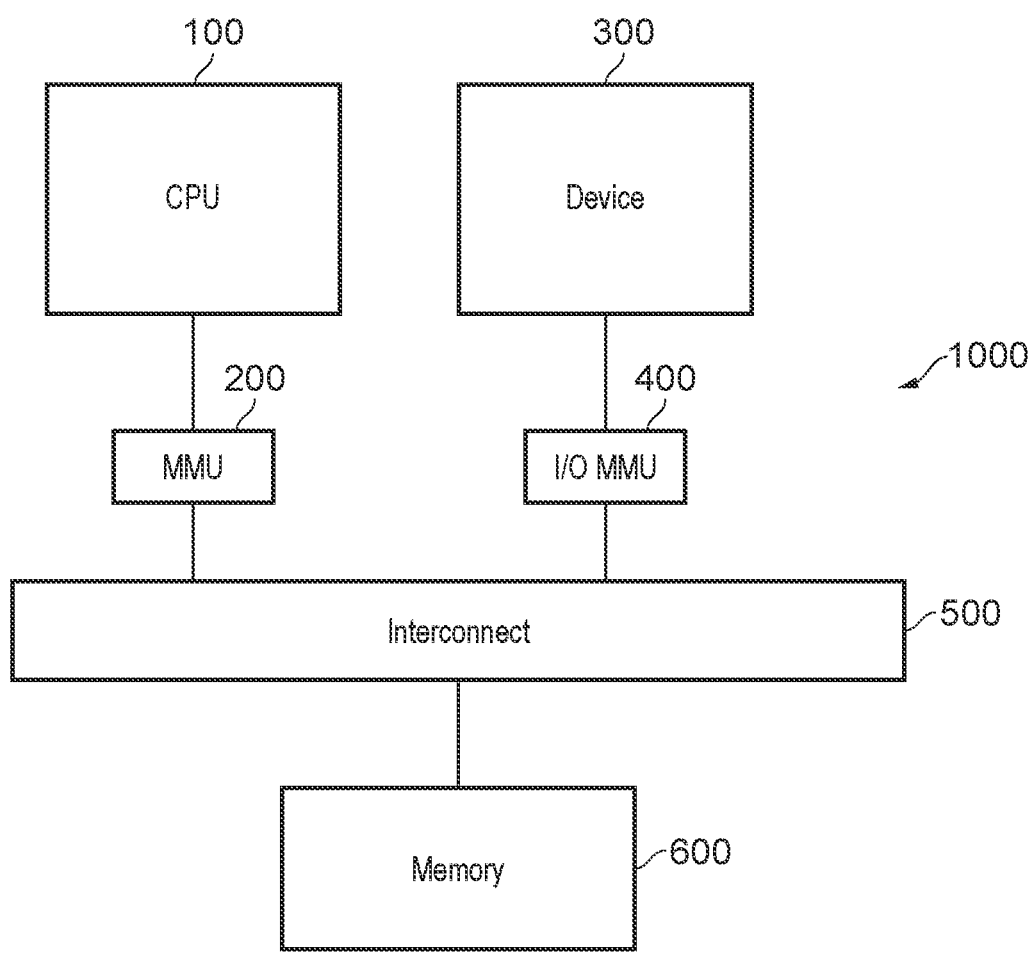
FIG. 1 illustrates an example of a system having a CPU and a device coupled to an interconnect for managing access to a shared memory.

A buffer structure can be used, for example, for queuing payloads which can be read by consumer circuitry which acts upon the payloads queued in the buffer. For example, the buffer can be a circular buffer or "ringbuffer". Some systems provide buffer control circuitry with registers to control access to the region of memory acting as the buffer. These can include a base address register to indicate a base address for the region of memory representing the buffer, a producer pointer register which can be used to identify the next entry of the buffer to be updated when a new payload is to be inserted into the buffer and a consumer pointer register which can be used to identify the next entry of the buffer to be processed by the consumer circuitry. The base address register may also indicate a size or length of the region of memory representing the buffer. When multiple requesters share access to the buffer, they may compete for setting the pointer and synchronisation may be desired to ensure that one requester's pointer update is seen by another requester. One approach can be that, in order to populate the queue, the requester obtains a lock associated with the producer pointer register which prevents other requesters updating the register. The producer then reads the value of the producer pointer, writes to the location indicated by the producer pointer in order to populate the queue. The producer pointer is then updated before the lock can be released.

This leads to a latency in that several read and write transactions are performed in response to several requests from the requester. It also means that for the time which it takes for these operations to be completed, no other requesters can access the registers required to populate the queue, because the requester in question has the lock. The buffer cannot therefore handle a large number of requests to populate the buffer in a short space of time.

In the examples discussed below, an apparatus comprises memory access circuitry to access a memory system. The memory system may be part of the apparatus itself or may be accessible via an interconnect, and can include on-chip or off-chip memory. The apparatus also includes a plurality of memory mapped registers, including at least an insert register and a producer pointer register. The memory mapped registers are registers which are visible to and addressable by a requester which seeks to populate the buffer. Memory mapped registers are accessible by issuing a memory access request specifying as its target address an address mapped to the memory mapped register. Use of the insert register is described below with reference to the insert operation. The producer pointer register stores a producer pointer value. The producer pointer value can be used to select a location in memory where the next payload should be stored. In some cases the producer pointer value may be an absolute memory address. In other cases the producer pointer value may indicate an offset from a base value which indicates the start of the buffer region in memory. In that case, the combination of the base and pointer offset therefore indicates the next entry which can be populated in the buffer. Also, it is not essential for the producer pointer value to directly indicate the next entry to be updated in the buffer region of memory. In general, the producer pointer value could indicate any information which allows the next entry to be updated to be determined. For example, the producer pointer value could actually indicate the most recent entry that was updated with a new payload, and this may indirectly indicate that the next entry to be updated is the following entry after the most recently updated entry.

The apparatus comprises control circuitry to perform an insert operation in response to receipt of an insert request from a requester device sharing access to the memory system. The requester device which issues the insert request could be any device which utilises or configures the buffer (and shares access to the memory system). The insert request is encoded in such a way that it specifies a target address mapped to the insert register and an indication of a payload. In response to the insert request, the control circuitry performs an insert operation which includes controlling the memory access circuitry to write the payload to a location in the memory system selected based on a producer pointer value stored in the producer pointer register. Hence, the requester does not need to first read the producer pointer register (or obtain a lock), or to actually write to the next entry of the buffer itself. Rather, the insert request according to the present technology can be targeted at the insert register and the allocation of the payload to the location in memory pointed to by the producer pointer register, and the updating of the producer pointer register to indicate the next available entry, can be done by the control circuitry associated with the memory mapped registers. This can reduce the total latency associated with the insertion of the payload into the buffer.

The value of the producer pointer is not necessarily communicated to the requester during this insert operation (although it could still be in some implementations). Furthermore, since the insert operation can be carried out locally and atomically (with respect to other insert operations) if necessary, it does not require the requester to obtain a lock prior to writing the payload to memory, even if there are multiple requesters. Thus, the process is simpler, can be carried out more quickly and efficiently, and the buffer can service requests from multiple requesting devices in a shorter space of time. In other words, as the insert operation triggered by the insert request includes both writing of the payload and updating the producer pointer register to increment the producer pointer value, this means that upon receiving another insert request the value of the producer pointer register may already indicate the next entry in the buffer. As described above, the producer pointer may indicate an offset, or an absolute memory address. In either case, this value is updated as part of the insert operation, and therefore is ready for the next insert request. This therefore negates the need to use a lock to protect the value of the producer pointer from being inadvertently read before it has been updated.

In one example, the insert operation is an atomic operation with respect to other insert operations, in the sense that when performing two insert operations in response to different insert requests, the second performed insert operation is guaranteed to see the updated producer pointer value resulting from the first performed insert operation. Hence, the control circuitry may be configured to serialise processing of received insert requests with respect to each other.

In one example the insert operation includes returning a status indication to the requester device. In response to the insert request, the apparatus may provide information back to the requesting device, for example indicating whether or not the payload has been successfully written to the queue. This could be a single bit confirmation or alternatively, could be a more complex error code as described below.

In one example the status indication comprises a multi-bit error code. A multi bit error code is able to encode indications of multiple possible errors (e.g. buffer being full, consumer circuitry not being ready to accept payloads, the payload requested to be inserted being a malformed payload which does not represent a valid encoding, etc.). Such an error code can be useful for enabling the requester device can accurately and appropriately perform any actions needed to correct the error. For example, the requester device can determine whether to re-issue the request, wait until an item in the buffer has been consumed or interrupt processing.

In some examples, when the control circuitry detects an error in response to the insert operation, the control circuitry is configured to make error status information accessible to supervisory software, the error status information providing at least some information not indicated in the status indication returned to the requester device in response to the insert request. For example, the control circuitry could record the error status information to a memory system location which is inaccessible to the requester but accessible to the supervisory software. This can be useful for a number of reasons. For example, it may not be desirable to allow the requester to see visibility of the precise cause of the error in case this exposes information on the operation of other requesters. Also, providing more detailed error status information to the supervisory software than is returned to the requester can be useful for a virtualised processing environment where the supervisory software may be emulating, in software, certain virtual functions which are not actually supported in the hardware provided, and the return of an error code to the supervisory software may help with the supervisory software deciding how to proceed.

The status indication (and/or the error status information made accessible to the supervisory software) may be indicative of whether a buffer region of memory, which includes the location selected based on the producer pointer value and is for queuing payloads awaiting processing by consumer circuitry, is full. As such, the status indication may inform the requester that the payload of the insert request has not been successfully added to the buffer.

The status information (and/or the error status information made accessible to the supervisory software) may indicate whether the consumer circuitry is stalled so that it cannot accept new payloads for processing. The consumer circuitry which takes the information stored in the memory region as inputs for processing may not be able to keep up with the rate at which the buffer is populated. If the consumer circuitry stalls and cannot therefore consume the payloads then it follows that the requester circuitry may also need to slow the rate at which the buffer is filled. It could act in some other way for example to stop the consumer circuitry from stalling.

The status information (and/or the error status information made accessible to the supervisory software) may indicate whether the payload specified by the insert request is malformed or unsupported by the consumer circuitry. In this case the requester (or supervisory software controlling virtualisation for example) could reissue the required request in the correct or supported form. In a case where the buffer circuitry can only return a single bit indication of whether an item has been added to the buffer, a negative indication does not give this detail as to why the item could not be added. Giving a multi-bit indication of why the insert request was not successful (e.g. distinguishing between the different causes of error mentioned in the previous paragraphs) means that the requester has a chance to reissue the request successfully.

It will be appreciated that not all of these possible status indications need be supported in a given implementation—some approaches may only encode some of these error types.

In some implementations, the status indication may comprise the previous producer pointer value (a value which the producer pointer register had prior to processing the insert request) or an incremented producer pointer value (a value to which the producer pointer register is updated in response to the insert request). Returning information about the producer pointer value can be useful to allow the requester to understand which entry of the buffer is associated with the inserted payload. This could allow the requester to determine when that inserted payload has been consumed by consumer circuitry, by accessing the consumer pointer which indicates the position in the buffer reached by the consumer circuitry and checking when it reaches or exceeds the value of the producer pointer returned in the insert operation.

In some examples the insert request has an encoding indicating that a store value is to be written to a given memory system location when a comparison condition is determined to be satisfied. The insert request has a payload and a target address but the target address is not the target address of the location where the payload is written to, instead the target address is an address mapped to the insert register. The comparison condition may depend on the value of the insert register for example. The comparison does not need to be determining whether two values are equal or directly match. A comparison condition could also depend upon other types of comparison, such as greater than, greater than or equal, less than or less than or equal comparisons.

The comparison condition could also depend on more complex combinations of comparison conditions (e.g. determining whether the payload indicated by the store value satisfies certain encoding rules or conditions).

The insert request may have an encoding representing a compare and swap request also specifying a compare value, for which the store value may be referred to as a "swap" value. In some systems, a compare and swap (CAS) operation may be supported such that, for CAS operations which specify a target address not mapped to the insert register, the memory system location written with the swap value when the comparison condition is satisfied is the location identified by the target address of the CAS. This may be carried out in dependence on a compare operation comparing the data stored at the address indicated by the target address of the CAS. However, according to the present technique, when the CAS specifies a target address mapped to the insert register, the control circuitry handles the CAS request differently (detecting that the CAS request represents an insert request) and, if the comparison condition is satisfied, the payload defined in the swap value (store value) is written to the memory system location selected based on the producer pointer instead, and an additional operation to update the producer pointer value in the producer pointer register is also performed. Thus, the target address of the request is not the location to which the swap value is written. As described further below, there may still be a compare operation that takes place, to determine whether it is possible to carry out the insert operation, and determine the contents of the status indication. By using a CAS operation to represent the insert request, this allows existing CAS transactions supported in a memory interconnect protocol to be used to control the insert operation, which means the technique can be implemented more efficiently with less modification to existing requester hardware, but by defining a different response taken to a CAS operation when it specifies an address mapped to the insert register, this reduces the latency associated with buffer update operations as discussed above.

In some examples, the insert operation comprises determining whether the comparison condition is satisfied based on a comparison between the compare value and a value stored in the insert register. This may not necessarily require an exact match between the compare value and the value stored in the insert register. It may otherwise require a partial match, or some other relationship between the two values (one being larger than the other for example). The swap value may be written to the memory region depending on the outcome of the comparison.

The control circuitry may be configured to set the value stored in the insert register to an error status value indicative of whether a new payload is able to be accepted in response to receipt of the insert request. When a compare and swap request is used to represent the insert request, the compare value of the compare and swap operation may be set to a value indicating that there is no error. Thus, when compared to the value stored in the insert register, a discrepancy indicates that an error has taken place. The value held in the insert register may then be returned to the requester as the status indication.

In some examples the insert operation comprises determining whether the comparison condition is satisfied based on the payload. For example, if the payload is malformed or in a format that is not supported in hardware by the consumer this may prevent it from being written to the memory region. Therefore the comparison condition may be configured to check whether the payload is compatible and return status information indicating if the payload has been rejected on this basis. Note that in this scenario it may be the "swap" value that is the subject of the comparison (either instead of comparing the "compare" value of a compare and swap request, or as part of a more complex set of comparisons which depend both on the compare value and the swap value).

The insert request may have an encoding indicating that a status indication is to be returned to the requester device in response to the insert request, the status indication indicative of whether the comparison condition is determined to be satisfied. For example, the outcome of the comparison condition may indicate whether or not there is an error.

The apparatus may also comprise a consumer pointer register to store a consumer pointer value; and consumer circuitry to perform a consume operation comprising reading a consumed payload from a memory system location identified based on the consumer pointer value, performing an action based on the consumed payload, and incrementing the consumer pointer value. In some cases the memory region disclosed herein acts as a buffer. Several payloads from several insert requests can be added to the buffer using the insert operation described above. Consumer circuitry can therefore perform operations using the data stored in the buffer. The consumer pointer value stored in the consumer pointer register indicates the next item in the buffer to be used by the consumer circuitry. The control circuitry which performs the insert operation could be local to the consumer circuitry, or could be in a separate part of the apparatus which is more physically remote from the consumer circuitry.

The consumer circuitry may have a different view of the memory system to that of the requester device. For example, the consumer circuitry may see the actual base address of the region in memory provided for the buffer storage, and may see the actual payloads written to the buffer region of memory. However, supervisory software executing on the requester device could implement virtualisation so that requesting software executing on the requester device does not see the actual data stored in memory. For example, accesses by requester software executing on the requester device to the buffer region of memory or to at least one of the memory mapped registers (e.g. a base address register) could be trapped to the supervisory software so that the supervisory software can step in and provide a different view of memory (e.g. by using page tables to indicate which addresses should fault if accessed by the requesting software, and/or to remap addresses accessed by the requesting software to different physical locations in memory to those accessed by the consumer circuitry).

The consumer circuitry described above may comprise, for example, a system memory management unit; a hardware accelerator; a graphics processing unit; or a network interface. It will be appreciated that this is not an exhaustive list, and other types of consumer circuitry could also have associated buffer structures which may be controlled based on an insert operation as discussed above.

In some examples the apparatus includes a forwarding path to forward, in response to the insert request, the payload specified by the insert request to the consumer circuitry to trigger the consumer circuitry to perform an action based on the forwarded payload. This means that the consumer circuitry can consume the payload of the insert request in parallel with it being added to the buffer in memory. For example, in the case of the first entry to the buffer, the consumer circuitry need not wait for the payload to be written to the memory region and then access the value of the consumer pointer register and use it to read the payload value back, in order to act upon that payload. This can improve performance by reducing delay (latency) in processing payloads.

In some examples the apparatus further comprises at least one requester device configured to issue the insert request. That is, the apparatus which includes the buffer control circuitry described herein may also include the requester device which issues the insert requests used to populate the buffer. For example, the requester device could be a processor core (e.g. a CPU).

The apparatus may comprise a plurality of requester devices each configured to issue the insert request. Thus, the buffer may store payloads from multiple requesters in the same section of memory. These multiple entries may be consumed in turn by the same consumer circuitry. The use of the insert register is particularly useful for systems with multiple requester devices, as it helps to reduce the need for locks which are costly for performance.

However, the insert register can also be useful even in a system with only one requester device, as a single requester device may still support multiple requesters, where the different requesters are different pieces of software executing on the same requester device.

FIG. 1 illustrates an example of a system (e.g. a data processing system, integrated circuit or System on Chip) having a number of devices and an interconnect for managing access to a shared memory. The system 1000 may include a CPU 100 for processing instructions. This CPU 100 may have a Memory Management Unit (MMU) 200 for translation of virtual addresses to physical addresses. The physical addresses may be used to access main memory 600 via an interconnect 500. Other devices such as the device 300 may also access the memory 600 via the interconnect 400. An IOMMU (input/output MMU, also known as a System MMU) 400 may also provide translations for virtual to physical addresses in the system 1000. While the MMU 200 is typically designed as an integral part of a CPU 100, the IOMMU 400 can be useful for supporting access to memory by devices 300 which do not themselves have an integral MMU 200. For example, the device 300 could be a hardware accelerator, network controller, or a peripheral device. While FIG. 1 only shows one CPU 100, there can be multiple CPUs 100 provided which may act as multiple requesters. Also, in some cases there can be multiple requesters executing in software on the same CPU 100. The memory 600 and/or the device 300 could be included on the same integrated circuit or piece of silicon as the other components, or could be off-chip components on a different integrated circuit or piece of silicon. Either way, the components of FIG. 1 can be regarded as a system.

Figure 2:
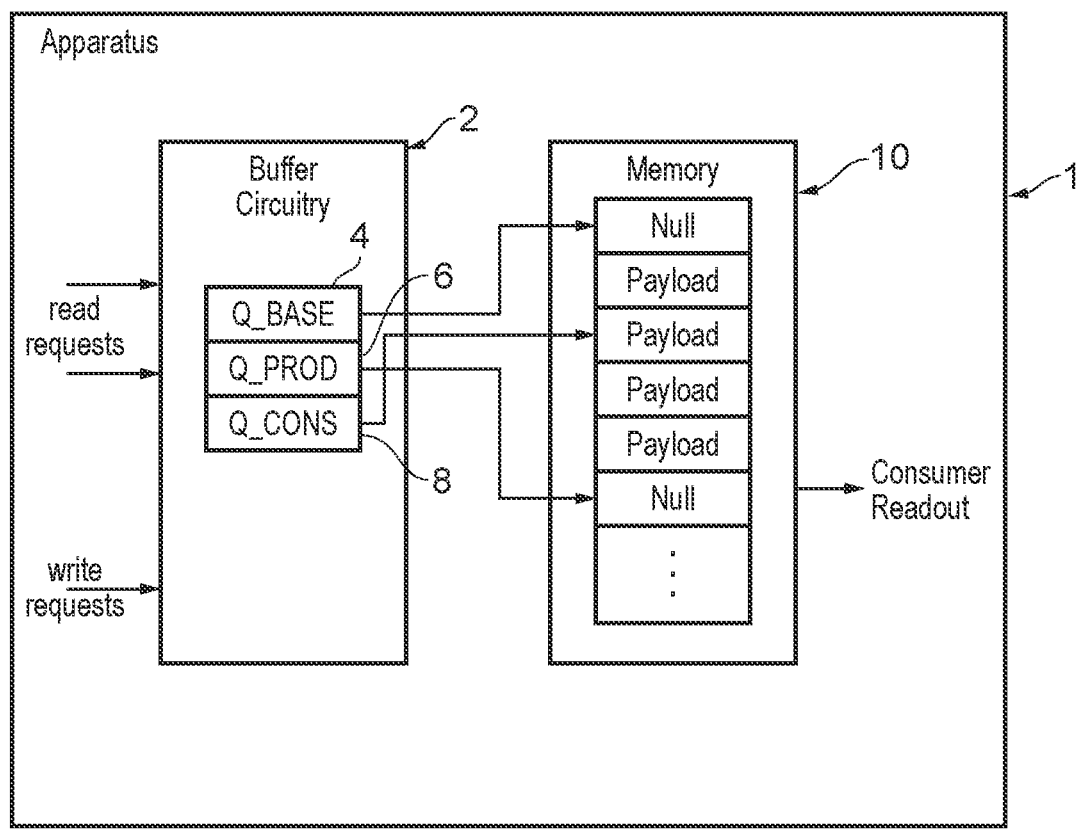
FIG. 2 shows an example of buffer circuitry having base, producer and consumer pointer registers.

FIG. 2 shows an example of buffer circuitry according to a comparative example using 3 control registers. The apparatus 1 may include buffer circuitry 2. This circuitry controls access and population of a memory region 10 which may be a region in main memory, or it may be local to the buffer circuitry. It will be appreciated that FIG. 2 merely illustrates the relationship between the registers 4, 6 and 8 and the memory region 10. The base register 4 "Q_BASE" stores a base address indicating a start of the memory region being used as the buffer. This register may also hold information indicating the size of the region in memory being used as the buffer. The producer register 6 "Q_PROD" holds an indication of the next location in the buffer to be populated by a producer (or requester). This is the next "free" entry in the buffer. The value in the producer register may be an absolute address, or alternatively the producer register 6 may store an offset value, which when added to the base address gives the address of the next entry to be populated. A series of reads and writes is needed in this scheme to populate the memory region 10 with the required payload. These are described in more detail with reference to FIG. 5 below. The consumer register 8 "QCONS" indicates the next entry in the memory region 10 to be read out by a consumer. Again, the value held in the consumer register 8 may be an absolute pointer value, or may be an offset value which defines the consumer pointer relative to the value held in the base register 6.

Figure 3:
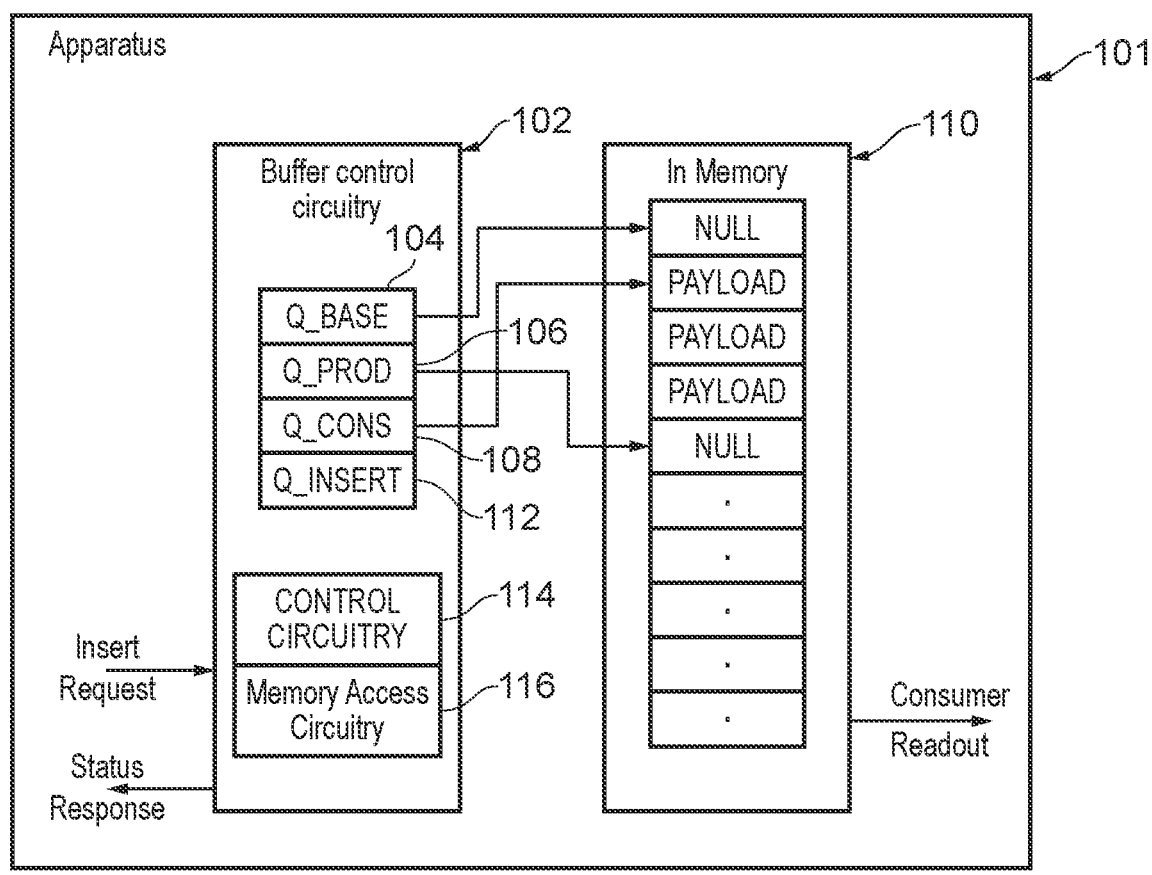
FIG. 3 shows an example of buffer control circuitry including an insert register.

FIG. 3 shows an example of an apparatus 101 including buffer control circuitry 102 memory mapped registers 104, 106, 108, 112 (including an insert register 112), control circuitry 114 and memory access circuitry 116. The apparatus 101 shown in FIG. 3 may be a portion of the system 1000 shown in FIG. 1. For example, the buffer control circuitry 102 could be part of the I/O MMU 400, the device 300, the interconnect 500, or another element of the system 1000 shown in FIG. 1. The memory region 110 accessed by the buffer control circuitry 102 may be part of memory 600 shown in FIG. 1 as accessible via the interconnect 500.

The memory mapped registers 104, 106, 108, 112 are registers which are accessible by a CPU 100 or other processing element executing software, via a mechanism by which the software may issue a memory access request to the interconnect 500 specifying a target address which is mapped to the memory mapped registers 104, 106, 108, 112. The memory access request used to access the memory mapped registers may have a same encoding format as other memory access requests used to access data storage in memory 600, but differs in that the target address specified is an address mapped to the registers 104, 106, 108, 112 instead of an address mapped to memory 600. Different memory mapped registers 104, 106, 108, 112 may be allocated different memory mapped addresses so that they can be independently referenced by software executing on the CPU 100.

The base, producer and consumer registers 104, 106 and 108 are similar to the registers 4, 6 and 8 of FIG. 2 described above. The insert register 112 is a further memory mapped register provided to act as a target for an insert request as described above. The insert request is received by the control circuitry 114 and in response to the request the control circuitry 114 is configured to control the memory access circuitry 116 to write the payload specified by the request to the memory location in region 110 that is indicated by the value stored in the producer register 106. In the insert operation, the control circuitry 114 also increments the value held in the producer pointer register 106 to indicate that the next entry in the memory region 110 should be populated next.

Regardless of whether any insert requests are received, the control circuitry 114 may set the value stored in the insert register 112 to indicate whether an error has occurred (for example indicating that the buffer is full or the consumer circuitry has stalled). Hence, at the time of receiving an insert operation, the insert operation may therefore include a step of comparing an expected value of the insert register 112 (e.g. a compare value specified in the insert request) with the actual value held in the insert register 112. A discrepancy between these two values therefore indicates an error. The value of the insert register 112 may be returned to the requester as a status response.

Using the apparatus 101 of FIG. 3, a single insert request can be used by a requester (e.g. CPU 100) to cause insertion of a payload to the buffer memory region 110 and also update the producer pointer 106. While the values of the base 104 and producer 106 registers are visible to the requester, the requester does not need to read them (with individual read requests) before issuing the write requests to populate the correct location in the memory region 110. The memory access circuitry 116 is able to access and populate the memory region 110 without the need for multiple accesses from the requester.

Figure 4:
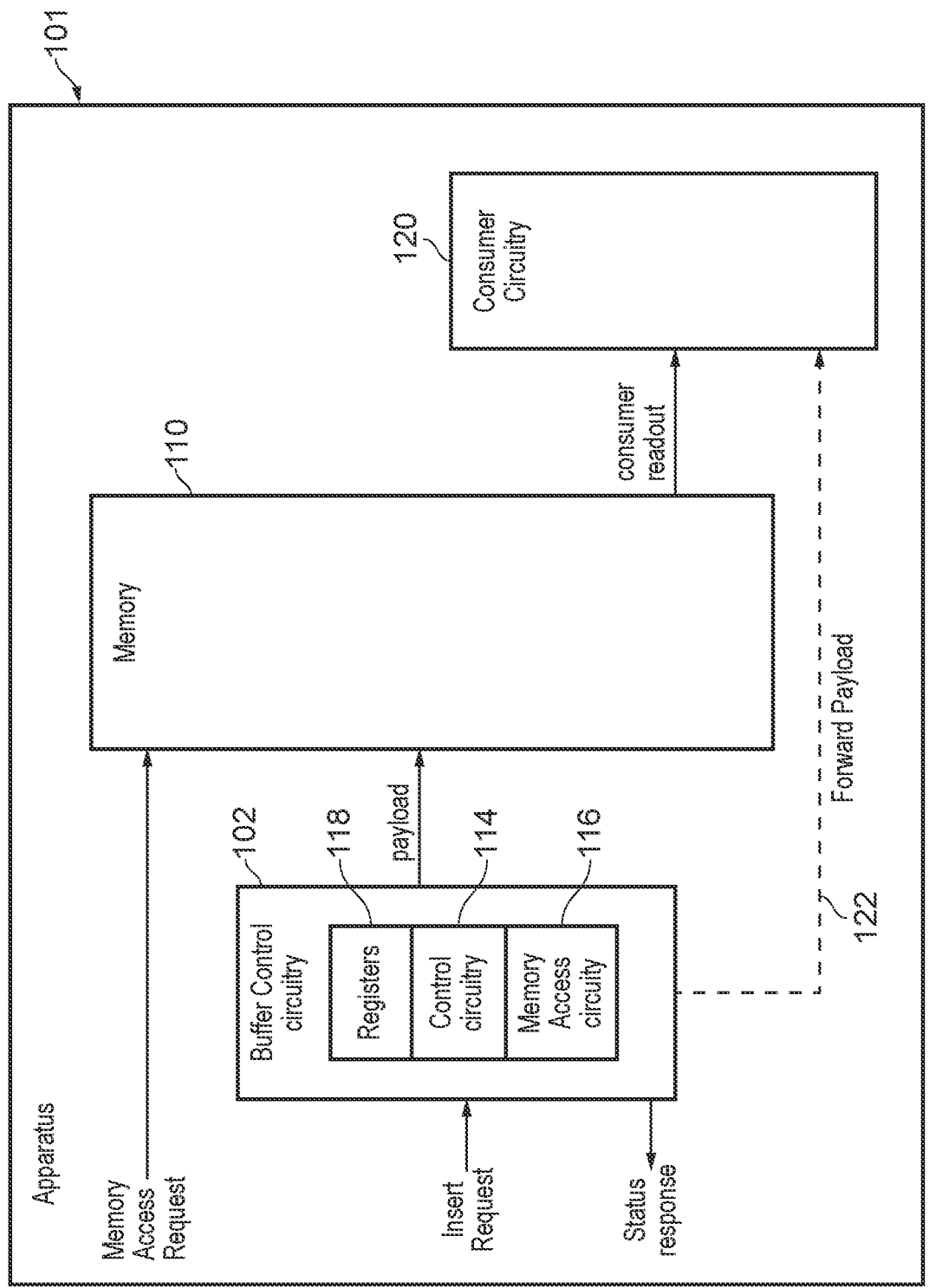
FIG. 4 shows an example of an apparatus including buffer control circuitry and consumer circuitry with a payload forwarding path.

FIG. 4 shows another example of an apparatus 1 including buffer control circuitry 102 and consumer circuitry 120 with a forward payload path 122. The apparatus 1 includes the buffer control circuitry 102 as discussed above. The registers 104, 106, 108, 112 are collectively indicated as registers 118 in FIG. 4. A requester can access the memory 110 directly using a memory access request specifying a target address not mapped to one of the memory mapped registers 118 of the buffer control circuitry. To populate the buffer, the requester issues an insert request (e.g. a memory access request specifying as its target address an address mapped to the insert register 112 in the register bank 118 within the buffer control circuitry 102). The control circuitry 114 performs the insert operation as described above. The apparatus 1 of FIG. 4 also includes consumer circuitry 120 which performs operations each using a payload from the memory region 110. The consumer circuitry 120 may obtain these values using a consumer readout from the memory region 110. However, in certain circumstances the buffer control circuitry 102 may forward the payload to the consumer circuitry 120 via the forward payload path 122. For example, if the difference between the consumer pointer and the producer pointer is smaller than a threshold, the control circuitry 114 of the buffer control circuitry 102 may determine that the consumer circuitry 120 may soon require the payload being inserted to the buffer, so that the delay associated with writing the payload to memory 110 and then reading it by the consumer circuitry 120 may cause the consumer circuitry 120 to stall. In a case when the forwarding path 122 can be used, the payload may also be stored in the memory region 110 (e.g. to ensure other observers of the buffer can read the new payload). However, by forwarding the payload to the consumer circuitry 120 as part of the insert operation, this means that the payload can bypass the memory region and be forwarded straight to the consumer circuitry, so that the consumer circuitry 120 can start processing the new payload faster. In some examples, the operation performed by the consumer circuitry can be performed (at least partially) in parallel with the insert operation.

Figure 5:
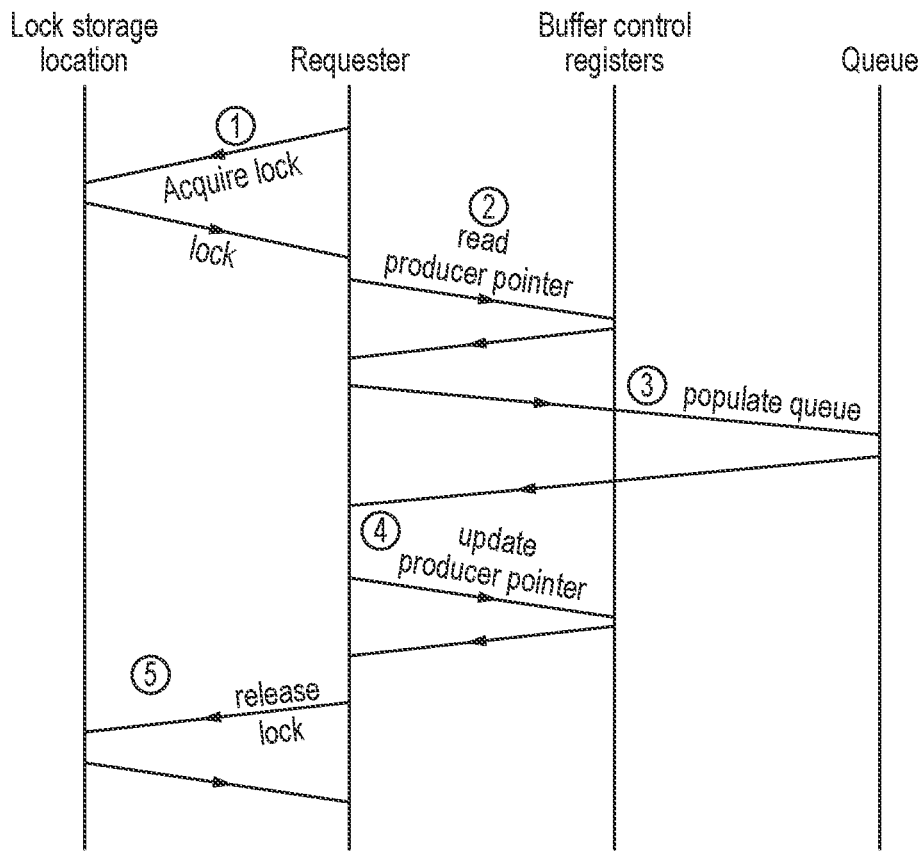
FIG. 5 illustrates a comparative example of using locks to ensure exclusivity of access to a buffer pointer location, when inserting items into a buffer.

FIG. 5 illustrates an example of populating a queue using a series of read and write requests, in the case when the approach shown in FIG. 2 not having the insert register is used. In order to populate the queue, the requester issues a series of requests. Firstly a lock is acquired in order to ensure that no other devices can access the relevant registers (particularly the producer pointer register 106) during the processing of populating the queue. While FIG. 5 shows the lock being acquired in response to a single access, in practice several accesses may be needed, especially if the lock is initially determined to be held by another requester so that repeated polling of the lock storage location may be needed until the lock can successfully be acquired. Once the lock has been acquired, the requester can issue a read request to obtain the value of the producer pointer. This may include reading the base address register as described above if the producer pointer is stored as an offset value (or alternatively if the base address is already known, the base address register may not need to be read). Once the requester has obtained the producer pointer value (which indicates where in the queue the next entry should be written) the requester can issue the write request to populate the queue. A write completion indication may then be returned. Next, the producer pointer is updated by the requester, so that it accurately reflects the next free entry of the queue. Finally the lock can be released by the requester, so that another entry may be added to the queue by another requester. The approach shown in FIG. 5 suffers from several problems. Firstly, it involves a large number of memory access transactions (e.g. at least five separate requests to: (1) acquire the lock, (2) read the producer pointer, (3) insert the payload into the queue, (4) update the pointer, and (5) release the lock). These transactions are all initiated from the requester device, e.g. the CPU 100 and incur an end-to-end latency in routing the transactions across the interconnect 500 to other parts of system 1000 and awaiting responses. Also, the use of a lock greatly increases average and worst-case latency when multiple requesters contend for updating the same buffer, but in an example like FIG. 2 which does not support the insert operation, locks or other similar synchronisation mechanisms would be needed to guard against the risk that a second requester reads the producer pointer in the period between the first requester reading the old producer pointer value and writing the new producer pointer value, which could risk the second requester then overwriting the first requester's new producer pointer value with exactly the same value (a single increment relative to the old producer pointer value read by the second requester before the first requester updated the pointer), leading to the two insert operations effectively only updating the producer pointer once, which can lead to errors.

Figure 6:
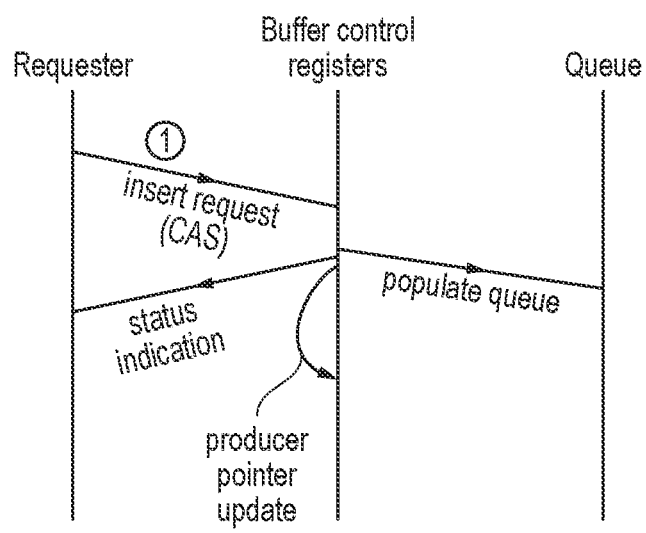
FIG. 6 illustrates an example of requesting a buffer insertion using a compare and swap request.

FIG. 6 illustrates an example of populating a queue using the insert operation described above. The producer does not need to issue multiple requests or obtain the lock. Instead the producer issues a compare and swap request, which acts as an insert request in this example. The compare and swap operation is described in more detail below. The buffer control circuitry according to the present technique then performs the insert request to populate the queue and update the producer pointer. A status indication can then be returned to the producer with information about the buffer or the payload. As described above, in some examples this may be a multi-bit indication that indicates to the producer a more complex reason as to why the queue may not be able to be populated if there is an error, rather than simply a pass/fail indication.

It can be seen from a comparison of FIGS. 5 and 6 that the present technique offers a simpler system. By using an insert request targeting the insert register, and providing control circuitry 114 (implemented as hardware circuit logic, rather than software) which responds to the insert request by causing the insert operation to be performed including both payload insertion and the producer pointer updated, the producer only needs to issue a single memory transaction, greatly reducing the total end-to-end delay associated with the insert operation. Also, there is no need to obtain a lock, because the control circuitry 114 may serialise processing of different insert requests received from different requesters, to ensure that the effects of one insert operation are taken into account for the next insert operation.

Figure 7:
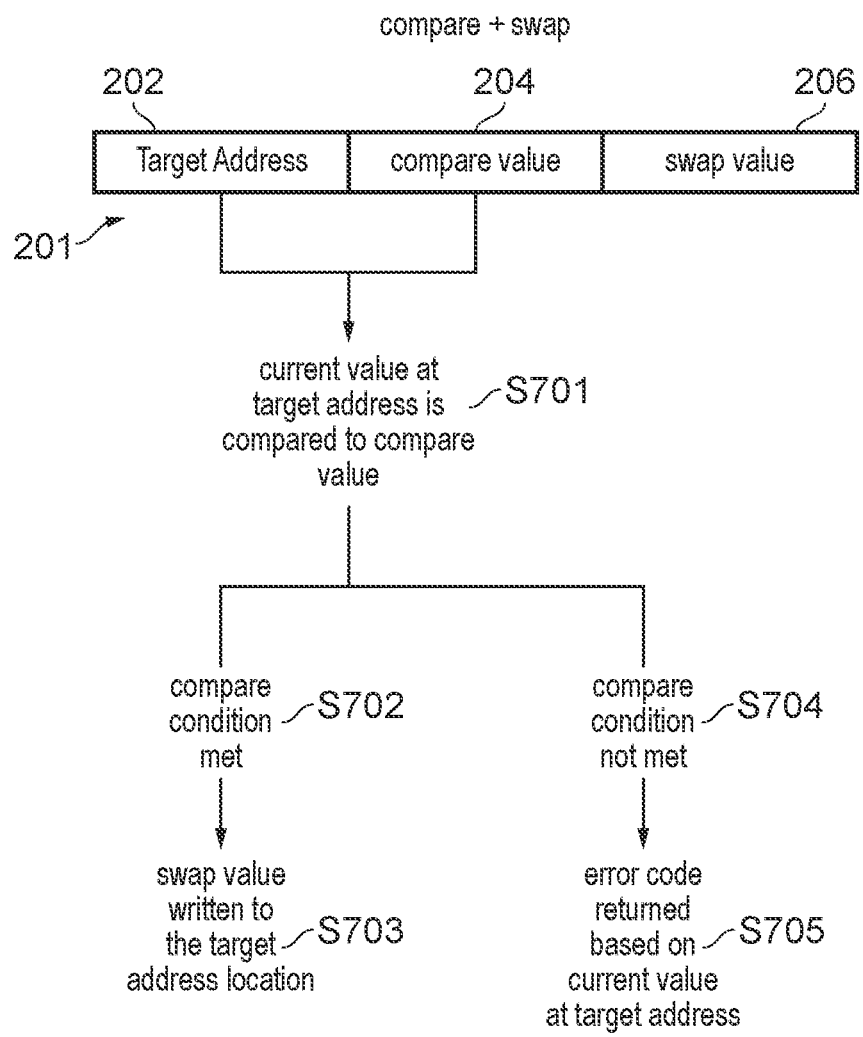
FIG. 7 illustrates an example of a compare and swap operation.

FIG. 7 illustrates an example of a compare and swap operation, when requested using a compare and swap request which specifies as its target address 202 an address other than the address mapped to the insert register 112 of the buffer control circuitry. An example encoding 201 of the compare and swap request is shown, comprising for example at least a target address 202, a compare value 204 and a swap value 206. At step S701 the current value at the memory location identified by the target address 202 is compared with the compare value 204 to determine whether a comparison condition is satisfied. This could be an "equals" comparison to determine the two values match, or could evaluate other types of comparison condition, e.g. a comparison to determine if one value is greater than the other. If the comparison condition is met, the process goes on to step S702 and the swap value 206 is written to the memory location identified by the target address 202 at step S703 (effectively the swap value is "swapped" with the previous contents of the addressed memory location). In some cases, at step S703 the old value stored at that memory location may be returned in response to the compare and swap request. Otherwise, if at step S704 the compare condition is not met, then at step S705 an error code is returned based on the current value at the target address, e.g. the value of the data previously stored at the addressed memory location could be returned so that the requester can understand why the comparison condition failed.

Figure 8:
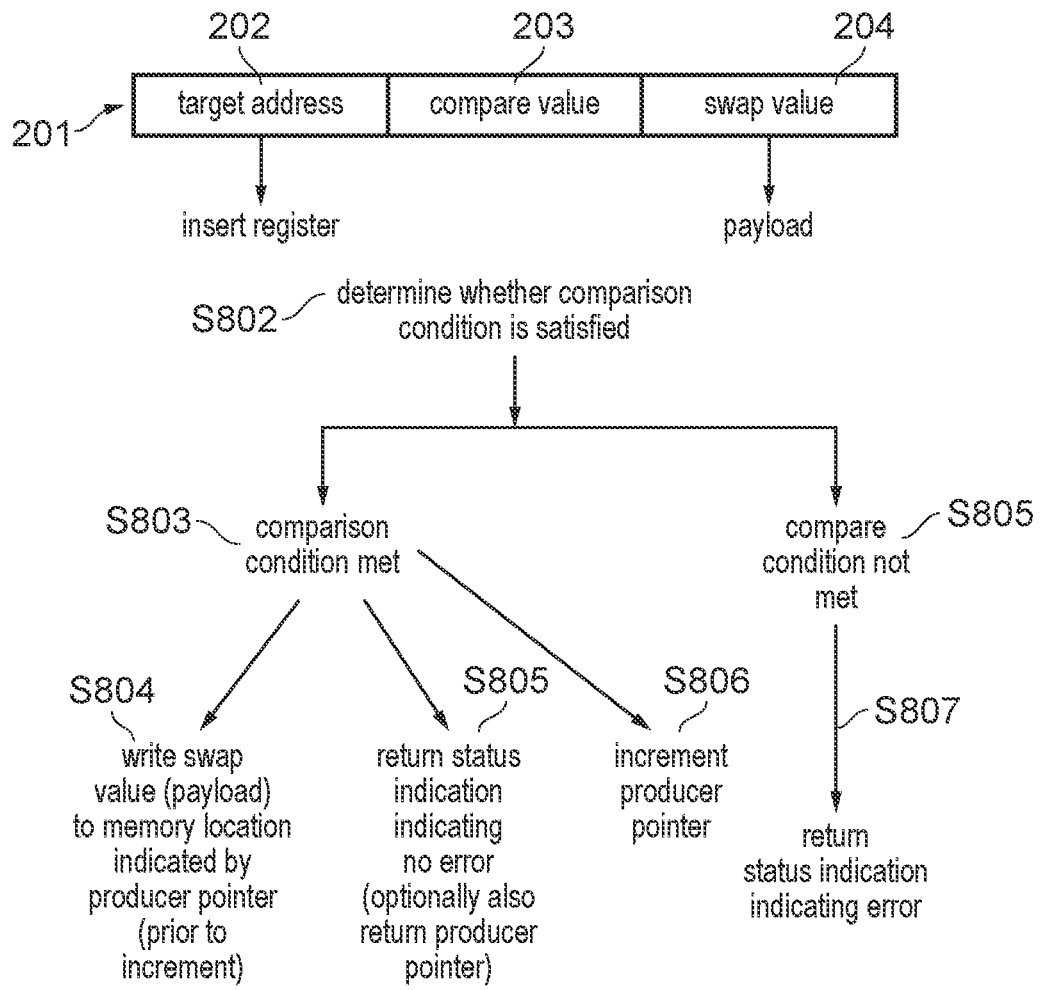
FIG. 8 illustrates an example an altered function of a compare and swap operation, when the compare and swap operation specifies as its target address an address mapped to the insert register, so that the compare and swap operation functions as an insert request.

FIG. 8 illustrates an example of the function of a modified compare and swap operation, which is performed as the insert operation when the compare and swap request instead specifies a target address 202 mapped to the insert register 112. The encoding 201 of the compare and swap request may be the same as for the compare and swap request of FIG. 7. Hence, there is no need to change the instruction set or memory protocol architecture supported by the CPU 100 in order to allow software executing on the CPU 100 to make use of the insert request. The CPU 100 can repurpose an existing format of compare and swap transaction to act instead as an insert request, by indicating a target address 202 mapped to the insert register of the buffer control circuitry.

In response to the insert request, at step S802 a determination is made as to whether a compare condition is satisfied. This could for example be based on a comparison of the compare value 203 and a value in the insert register (e.g. the value in the insert register 112 may be maintained by the buffer control circuitry 114 to indicate whether an error has arisen, and the compare value 203 could encode a value (e.g. zero) which the insert register 112 is expected to have when no error arises—this approach can preserve part of the expected compare-and-swap behaviour of a compare and swap request so that the insert operation can more closely align to normal compare and swaps, which can simplify implementation in circuit hardware). The comparison condition could also depend on whether the buffer is full. The comparison condition could also depend on whether the consumer circuitry is stalled. Also, the comparison condition could depend on the payload indicated in the swap value 204 (e.g. checking whether the payload is encoded correctly or represents a valid payload that can be processed by the hardware of the consumer circuitry). At step S803 if the compare condition is determined to be met then steps S804, S805 and S806 are performed. The relative timing or sequence of steps S804, S805, S806 does not matter as long as the memory location selected for writing the payload at step S804 uses the value of the producer pointer prior to the increment at step S806, and there is a mechanism to determine observability of the different actions (the order does not matter as long as it is defined, or the order does not matter as long as there is another synchronisation mechanism to guarantee observability). At step S804 the swap value is written to the memory location pointed to by the producer pointer in register 106 (note that this differs from the normal compare and swap behaviour as the memory location updated is not the one identified by the target address 202 of the compare and swap request). At step S805 the status indication is set to indicate no error has taken place and is returned to the requester. Optionally at step S805 the value of the producer pointer may be returned to the requesting device (either the old value prior to the increment, or the new value after the increment at step S806). At step 806 the producer pointer is incremented. If it is determined at step S805 that the compare condition is not met, then at step S807 the status indication is returned indicating an error. The status indication can be a multi-bit indication to indicate one of several possible error conditions.

Although FIG. 8 shows the payload being written to memory at step S804 and the producer pointer being incremented at step S806 only in the case when the comparison condition is met, other examples could choose also to perform steps S804 and S806 in the case when the comparison condition is not met. By writing the payload to memory and incrementing the producer pointer, this can be useful to allow a hypervisor or other supervisory code to examine the payload that triggered an error condition to decide how to proceed.

Figure 9:
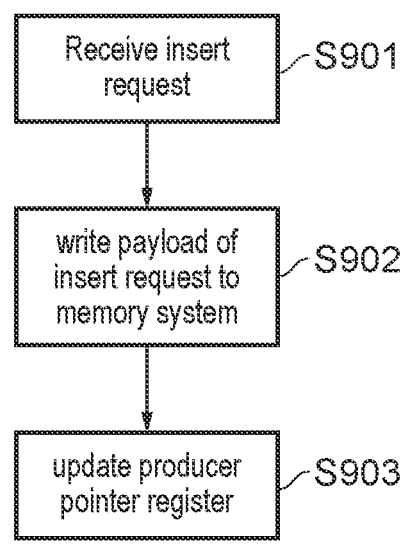
FIG. 9 is a flow diagram showing a method of processing an insert request requesting insertion of a payload into a buffer structure.

FIG. 9 is a flow diagram showing a method according to the present technique. At step S901 an insert request is received, specifying at least a target address and a payload. The target address is the address of an insert register. The payload of the insert request is written to a location in the memory system indicated by the producer pointer register at step S902. It should be noted that the target location identified by the address of the insert request is not the location to which the payload is written. At step S903 the value held in the producer pointer register is updated. Steps S902 and S903 are shown in sequence in FIG. 9, but could be performed in the opposite order or in parallel in other examples.

Figure 10:
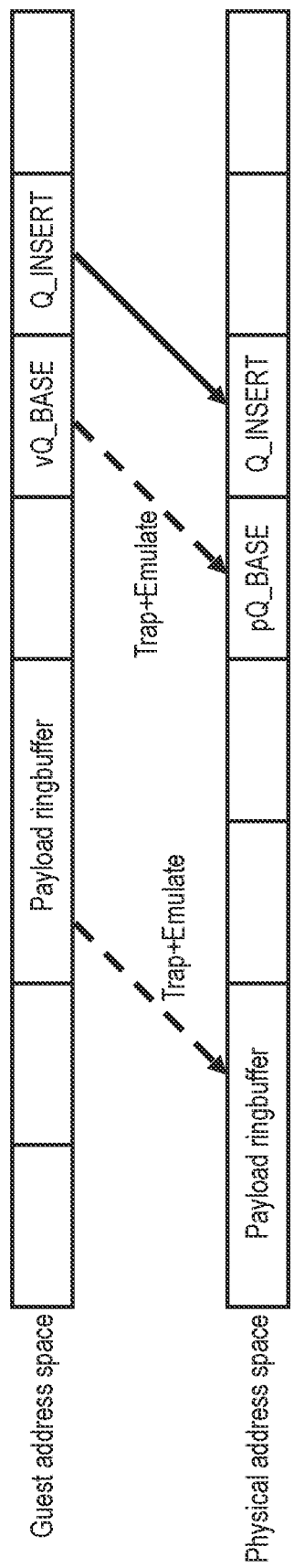
FIG. 10 illustrates the use of a buffer in a system with virtualisation.

FIG. 10 illustrates an example of the use of the insert register in a system involving virtualisation. For example, the consumer circuitry (e.g. device 300 or I/O MMU 400) may have hardware which supports a certain range of functions, but software executing on the CPU 100 may perceive the consumer circuitry to have a wider range of functions including some functions not supported in hardware. Supervisory software (e.g. a hypervisor) executing on the CPU 100 may control address mappings (provided by page tables used for controlling address translation by the MMU 200) to ensure that the requester software (e.g. a guest operating system) executing on the CPU 100 may see a different view of memory than what is actually provided to the consumer circuitry. FIG. 10 shows views of the addresses mapped to the insert register 112 (Q_INSERT), the base register 104 (Q_BASE) and the buffer region of memory 110 (payload ringbuffer), as viewed in both the guest address space seen by requester software and the physical address space representing the actual contents of memory seen by the consumer circuitry.

The buffer base address is set when the buffer is configured, before the insertion sequence starts. The hypervisor may set the page tables so that the guest address mapped to the base address register Q_BASE does not have a page table entry defined (or the S2 page table entry is marked as "trap to hypervisor"), so that the Guest OS's access to Q_BASE causes a memory fault to trap to the hypervisor which steps in and changes the base address value to be written to Q_BASE as necessary (to indicate where the buffer is really stored in physical memory).

When the guest OS wants to write a new command to the buffer, it issues the insert request (compare and swap (CAS) request) specifying as its target address the guest address of the Q_INSERT register, with the payload to be inserted encoded in the swap value of the CAS request. The hypervisor may have set the page tables so that the guest address mapped to the insert register 112 does have a mapping defined and does not need to trap to the hypervisor, so that (provided there is no error such as the buffer being full or the payload being invalid) the insert operation can take place without trapping to the hypervisor. Hence, if there is no error, the payload is written by the control hardware to the address of the next free entry in the ringbuffer in memory (e.g. the location identified by Q_BASE+Q_PROD—note that here the hardware will see the real physical address pQ_BASE indicated as the base address in the base address register 104), and the producer pointer register Q_PROD is incremented by the hardware as explained earlier. A "success" code is returned by the hardware as the status indication in response to the CAS request. In parallel with writing the payload to the ringbuffer in memory, the hardware can also action the payload if it has capacity, as the payload can be forwarded to the consumer circuitry 120 via the forwarding path 122. If the consumer circuitry 120 actions the payload, the consumer pointer is also incremented.

If there is an error, the payload is (optionally) not written to the buffer and the producer pointer is not incremented, and an error code is returned in response to the insert (CAS) request. Alternatively, some implementations could write the payload to the buffer anyway and increment the pointer, and return the error code, so that the hypervisor can inspect the payload in the buffer. The error code can be checked by the guest OS who issued the insert request, and the guest OS may choose to trap to the hypervisor voluntarily, or alternatively this may happen automatically in response to the error code. For example, one reason for an error could be that the payload indicated by the insert request requires functions which are not supported in hardware by the consumer circuitry, so require emulation by the hypervisor. Hence, the hypervisor can check the payload requested by the insert request sent by the guest OS, and emulate that function in software, e.g. by writing one or more different payloads to the ringbuffer (and incrementing the producer pointer accordingly), to replace the payload that the guest OS tried to write to the buffer. The page tables may also be set to indicate that an access to the guest address representing the location of the ringbuffer traps to the hypervisor, so that if the producer software (guest OS) tries to read the memory location of the ringbuffer itself, this is trapped and emulated by the hypervisor (as shown by dotted arrow on left hand side of FIG. 10), so that the hypervisor can for example simulate the view of the ringbuffer contents which the guest address space expects to be present, even though the actual ringbuffer contents may be different.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

The invention claimed is:

1. An apparatus comprising:
   memory access circuitry to access a memory system;
   a plurality of memory mapped registers, including at least an insert register and a producer pointer register; and
   control circuitry to perform an insert operation in response to receipt of an insert request from a requester device sharing access to the memory system, the insert request specifying an address mapped to the insert register and an indication of a payload,
   the insert operation including controlling the memory access circuitry to write the payload to a location in the memory system selected based on a producer pointer value stored in the producer pointer register, and updating the producer pointer register to increment the producer pointer value,
   wherein the insert request has an encoding indicating that a store value is to be written to a given memory system location when a comparison condition is determined to be satisfied, and
   for the insert request, the store value specifies the payload and the given memory system location is the location in the memory system selected based on the producer pointer value.

2. The apparatus according to claim 1, wherein the insert operation includes returning a status indication to the requester device.

3. The apparatus according to claim 2, wherein the status indication comprises a multi-bit error code.

4. The apparatus according to claim 2, in which, when the control circuitry detects an error in response to the insert operation, the control circuitry is configured to make error status information accessible to supervisory software which controls operation of the requester, the error status information providing at least some information not indicated in the status indication returned to the requester device in response to the insert request.

5. The apparatus according to claim 2, in which the status indication is indicative of at least one of:
   whether a buffer region of memory, which includes the location selected based on the producer pointer value and is for queuing payloads awaiting processing by consumer circuitry, is full;
   whether the consumer circuitry is stalled so that it cannot accept new payloads for processing; and
   whether the payload specified by the insert request is malformed or unsupported by the consumer circuitry.

6. The apparatus according to claim 2, wherein the status indication comprises the producer pointer value read from the producer pointer register in response to the insert request, or an incremented producer pointer value.

7. The apparatus according to claim 1, wherein the insert request has an encoding representing a compare and swap request also specifying a compare value.

8. The apparatus according to claim 7, wherein the insert operation comprises determining whether the comparison condition is satisfied based on a comparison between the compare value and a value stored in the insert register.

9. The apparatus according to claim 8, wherein the control circuitry is configured to set the value stored in the insert register to an error status value indicative of whether a new payload is able to be accepted in response to receipt of the insert request.

10. The apparatus according to claim 1, wherein the insert operation comprises determining whether the comparison condition is satisfied based on the payload.

11. The apparatus according to claim 1, wherein the insert request has an encoding indicating that a status indication is to be returned to the requester device in response to the insert request, the status indication indicative of whether the comparison condition is determined to be satisfied.

12. The apparatus according to claim 1, comprising:
    a consumer pointer register to store a consumer pointer value; and
    consumer circuitry to perform a consume operation comprising reading a consumed payload from a memory system location identified based on the consumer pointer value, performing an action based on the consumed payload, and incrementing the consumer pointer value.

13. The apparatus according to claim 12, wherein the consumer circuitry has a different view of the memory system to a view of the memory system provided to the requester device.

14. The apparatus of claim 12, wherein the consumer circuitry comprises at least one of:
    an I/O memory management unit;
    a hardware accelerator;
    a graphics processing unit; and
    a network interface.

15. The apparatus according to claim 12, comprising a forwarding path to forward, in response to the insert request, the payload specified by the insert request to the consumer circuitry to trigger the consumer circuitry to perform an action based on the forwarded payload.

16. An apparatus according to claim 1, further comprising at least one requester device configured to issue the insert request.

17. An apparatus according to claim 1, further comprising a plurality of requester devices each configured to issue the insert request.

18. A method for an apparatus comprising memory access circuitry to access a memory system and a plurality of memory mapped registers, including at least an insert register and a producer pointer register; the method comprising:
    receiving an insert request from a requester device sharing access to the memory system, the insert request specifying an address mapped to the insert register and an indication of a payload; and
    in response to receipt of the insert request, performing an insert operation including controlling the memory access circuitry to write the payload to a location in the memory system selected based on a producer pointer value stored in the producer pointer register, and updating the producer pointer register to increment the producer pointer value,
    wherein the insert request has an encoding indicating that a store value is to be written to a given memory system location when a comparison condition is determined to be satisfied, and
    for the insert request, the store value specifies the payload and the given memory system location is the location in the memory system selected based on the producer pointer value.

19. An apparatus comprising:
    memory access circuitry to access a memory system;
    a plurality of memory mapped registers, including at least an insert register and a producer pointer register; and
    control circuitry to perform an insert operation in response to receipt of an insert request from a requester device sharing access to the memory system, the insert request specifying an address mapped to the insert register and an indication of a payload, the insert operation including controlling the memory access circuitry to write the payload to a location in the memory system selected based on a producer pointer value stored in the producer pointer register, and updating the producer pointer register to increment the producer pointer value, wherein the insert operation includes returning a status indication to the requester device, and when the control circuitry detects an error in response to the insert operation, the control circuitry is configured to make error status information accessible to supervisory software which controls operation of the requester, the error status information providing at least some information not indicated in the status indication returned to the requester device in response to the insert request.

* * * * *